United States Patent
Pywell

(10) Patent No.: US 7,963,603 B2
(45) Date of Patent: Jun. 21, 2011

(54) VEHICLE SEAT STABILIZATION SYSTEM AND A STABILIZATION DEVICE

(75) Inventor: James F. Pywell, Shelby Township, MI (US)

(73) Assignee: GM Global Technology Operations LLC, Detroit, MI (US)

( * ) Notice: Subject to any disclaimer, the term of this patent is extended or adjusted under 35 U.S.C. 154(b) by 214 days.

(21) Appl. No.: 12/351,895

(22) Filed: Jan. 12, 2009

(65) Prior Publication Data

US 2010/0176628 A1   Jul. 15, 2010

(51) Int. Cl.
*B60N 2/42* (2006.01)
(52) U.S. Cl. ........... 297/216.16; 297/216.1; 297/216.19; 297/302.2
(58) Field of Classification Search ........... 297/216.1, 297/216.16, 216.19, 302.2, 344.11, 344.13, 297/362.13
See application file for complete search history.

(56) References Cited

U.S. PATENT DOCUMENTS

| | | | | |
|---|---|---|---|---|
| 3,762,514 A | * | 10/1973 | Freitag | 188/300 |
| 5,294,175 A | * | 3/1994 | Elton | 297/216.1 |
| 5,582,385 A | * | 12/1996 | Boyle et al. | 248/550 |
| 5,652,704 A | * | 7/1997 | Catanzarite | 701/49 |
| 5,743,591 A | | 4/1998 | Tame | |
| 5,868,472 A | * | 2/1999 | Grilliot et al. | 297/452.18 |
| 6,050,637 A | * | 4/2000 | Håland et al. | 297/216.14 |
| 6,601,915 B2 | * | 8/2003 | Sullivan et al. | 297/216.1 |
| 6,604,771 B2 | * | 8/2003 | Motozawa et al. | 296/68.1 |
| 6,890,027 B2 | * | 5/2005 | Marie et al. | 297/216.1 |
| 7,137,330 B2 | | 11/2006 | Christopher | |
| 7,628,357 B2 | * | 12/2009 | Mercier et al. | 244/122 R |
| 2002/0145315 A1 | * | 10/2002 | Fraley et al. | 297/216.13 |
| 2003/0020306 A1 | * | 1/2003 | Eckendorff | 297/216.1 |
| 2006/0196715 A1 | * | 9/2006 | Fujishiro et al. | 180/271 |
| 2008/0093899 A1 | | 4/2008 | Stueckle | |
| 2008/0156602 A1 | * | 7/2008 | Hiemenz et al. | 188/267.1 |

* cited by examiner

*Primary Examiner* — Laurie K Cranmer
(74) *Attorney, Agent, or Firm* — Quinn Law Group, PLLC

(57) ABSTRACT

A vehicle seat stabilization system configured for minimizing downward displacement of a seat cushion upon vehicle impact includes a vehicle seat and a stabilization device. The seat has a first and second vertical position and includes the cushion, a torque tube, mounting arrangement, slide assembly, and lift linkage. The device is configured for minimizing downward displacement of the cushion upon vehicle impact and includes a piston, rod, first cylinder, and a second cylinder disposed entirely within and cooperating with the first cylinder to define a conduit. The piston divides the second cylinder and defines a first and second chamber in fluid communication via the conduit. The device includes fluid and a member disposed within the second cylinder moveable upon vehicle impact to seal off fluid communication between the conduit and the second chamber to minimize downward displacement of the cushion upon impact when the seat is in the second position.

18 Claims, 5 Drawing Sheets

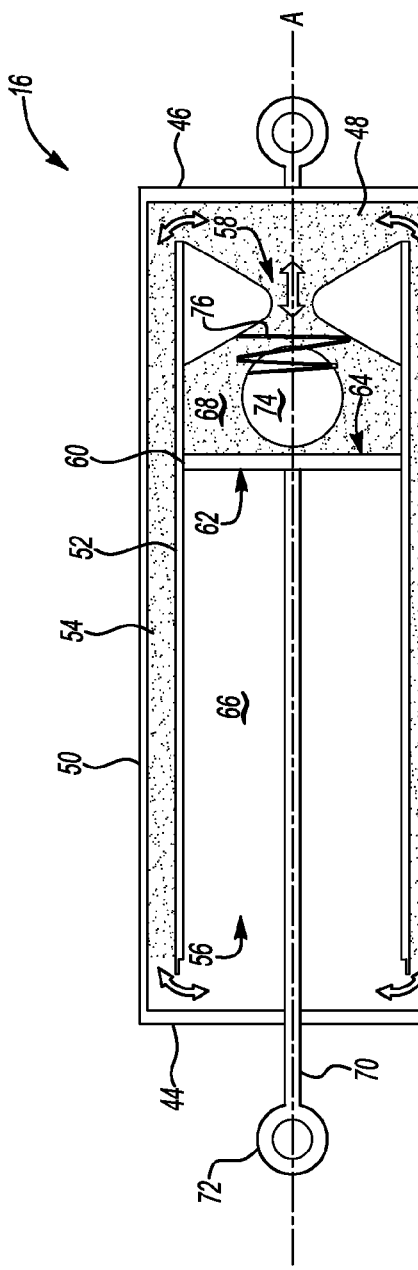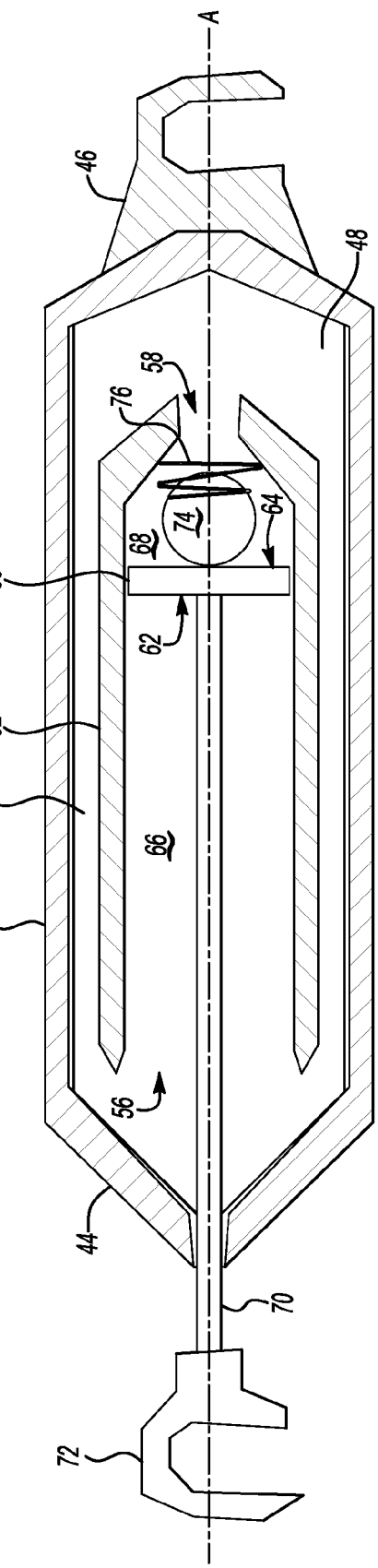

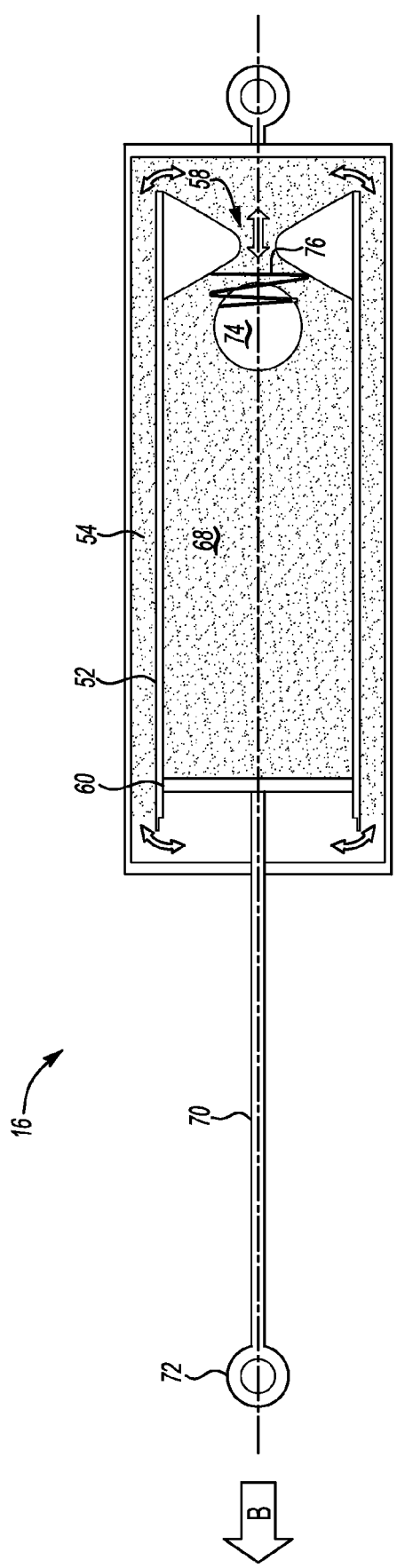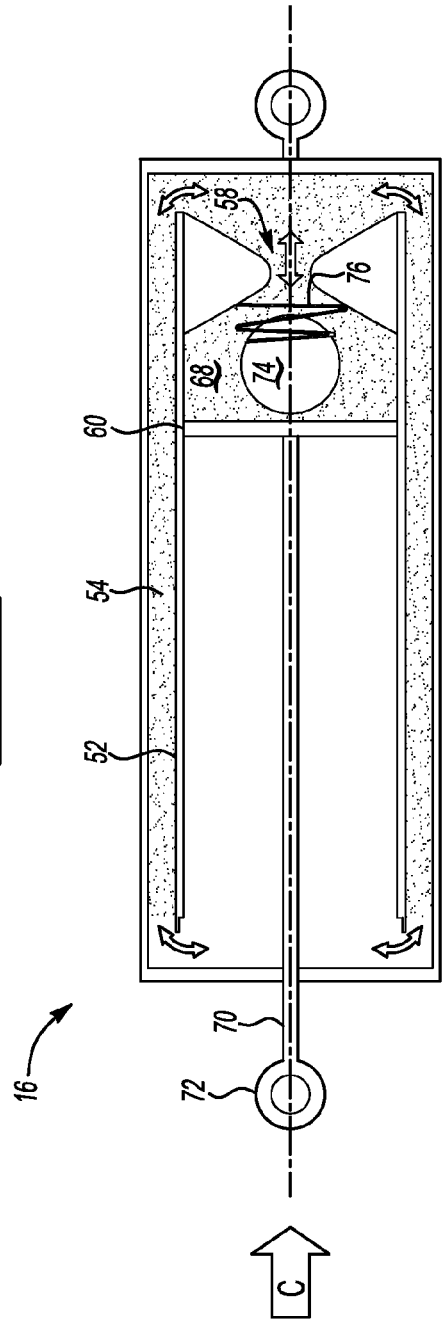

VEHICLE SEAT STABILIZATION SYSTEM AND A STABILIZATION DEVICE

TECHNICAL FIELD

The present invention generally relates to seats for vehicles, and more specifically, to a vehicle seat stabilization system and a stabilization device.

BACKGROUND OF THE INVENTION

Vehicle components, such as vehicle seats, may experience substantial forces upon vehicle impact. For example, upon a rear vehicle impact, a vehicle seat may experience substantial downward forces along a seat cushion. Accordingly, it is desirable that vehicle seats compensate for such forces.

Moreover, many existing vehicle seats are mechanically adjustable according to occupant height. Such mechanical adjustability often complicates compensation for the substantial forces that may be imparted to the vehicle seat upon vehicle impact. The art includes a variety of devices for compensating for such forces. However, many existing devices are not cost-effective and do not adequately provide for occupant comfort.

SUMMARY OF THE INVENTION

A vehicle seat stabilization system configured for minimizing downward displacement of a seat cushion of a vehicle seat upon vehicle impact includes the vehicle seat and a stabilization device. The vehicle seat is configured for supporting an occupant of a vehicle and has a first vertical position and a second vertical position. The vehicle seat includes the seat cushion having a frame and is configured for supporting the occupant seated thereon. The vehicle seat also includes a torque tube configured for minimizing torsion of the seat cushion. The torque tube is disposed between and attached to the frame of the seat cushion. Additionally, the vehicle seat includes a mounting arrangement configured for attaching the vehicle seat to the vehicle, a slide assembly configured for translating the vehicle seat fore and aft, and a lift linkage. The lift linkage is configured for mechanically moving the vehicle seat from the first vertical position to the second vertical position and is pivotably attached to the seat cushion and the slide assembly.

The stabilization device of the vehicle seat stabilization system is configured for minimizing downward displacement of the seat cushion upon vehicle impact and has a proximal end and a distal end. The distal end is attached to the vehicle seat. The stabilization device includes a first cylinder and a second cylinder disposed entirely within the first cylinder. The second cylinder cooperates with the first cylinder to define a conduit between the first cylinder and the second cylinder. The stabilization device also includes a piston and a rod coupled to the piston. The piston has a proximal side and a distal side and is configured for sealingly sliding in the second cylinder so as to divide the second cylinder and define a first chamber adjacent the proximal side of the piston and a second chamber adjacent the distal side of the piston. The first chamber and the second chamber are in fluid communication via the conduit. The rod is also coupled to the torque tube and extends through the proximal end of the stabilization device. Further, the stabilization device includes a fluid contained within the first cylinder for fluid communication between the first chamber and the second chamber via the conduit. The stabilization device also includes a member disposed within the second cylinder. The member is moveable upon vehicle impact to seal off fluid communication between the conduit and the second chamber so as to minimize downward displacement of the seat cushion upon vehicle impact when the vehicle seat is disposed in the second vertical position.

A stabilization device configured for minimizing downward displacement of a seat cushion of a vehicle seat upon vehicle impact has a proximal end and a distal end and includes a first cylinder and a second cylinder disposed entirely within the first cylinder. The second cylinder cooperates with the first cylinder to define a conduit between the first cylinder and the second cylinder. The stabilization device also includes a piston having a proximal side and a distal side. The piston is configured for sealingly sliding in the second cylinder so as to divide the second cylinder and define a first chamber adjacent the proximal side of the piston and a second chamber adjacent the distal side of the piston. The first chamber and the second chamber are in fluid communication via the conduit. Additionally, the stabilization device includes a rod coupled to the piston and extending through the proximal end of the stabilization device. Further, the stabilization device includes a fluid contained within the first cylinder for fluid communication between the first chamber and the second chamber via the conduit. The stabilization device also includes a member disposed within the second cylinder. The member is moveable upon vehicle impact to seal off fluid communication between the conduit and the second chamber to minimize downward displacement of the seat cushion upon vehicle impact.

The vehicle seat stabilization system and stabilization device of the present invention minimize downward displacement of the seat cushion upon vehicle impact. Further, the vehicle seat stabilization system and stabilization device compensate for forces imparted to the seat cushion upon vehicle impact. Additionally, the vehicle seat stabilization system and stabilization device are cost-effective and provide for occupant comfort.

The above features and advantages and other features and advantages of the present invention are readily apparent from the following detailed description of the best modes for carrying out the invention when taken in connection with the accompanying drawings.

BRIEF DESCRIPTION OF THE DRAWINGS

FIG. 4A is a schematic side view of the stabilization device of FIG. 3;

FIG. 4B is a schematic cut-away view of the stabilization device of FIGS. 3 and 4A;

FIG. 5A is a schematic side view of the stabilization device of FIGS. 3, 4A, and 4B representing operation in a vehicle not subject to vehicle impact wherein the vehicle seat of FIGS. 1 and 2 is raised to the second vertical position;

FIG. 5B is a schematic side view of the stabilization device of FIGS. 3, 4A, and 4B representing operation in a vehicle not subject to vehicle impact wherein the vehicle seat of FIGS. 1 and 2 is lowered to the first vertical position;

DESCRIPTION OF THE PREFERRED EMBODIMENTS

Figure 1:
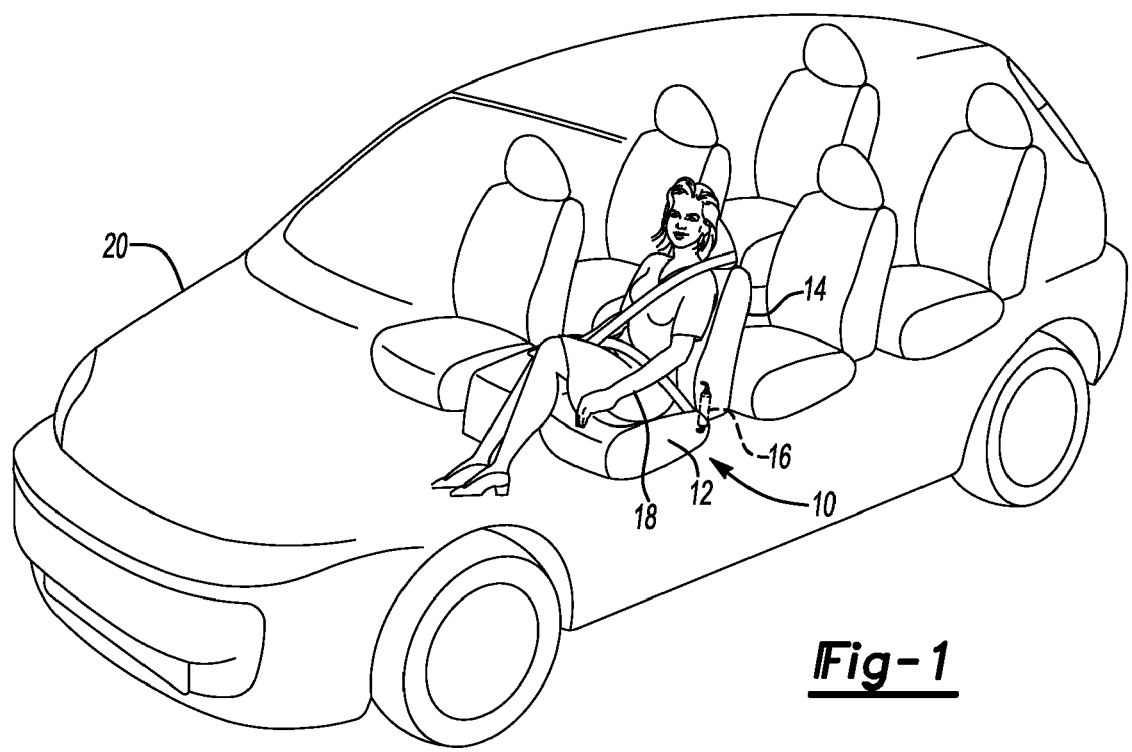
FIG. 1 is a schematic perspective view of a vehicle seat stabilization system with an occupant seated upon a vehicle seat in a vehicle.

Referring to the drawings, wherein like reference numerals refer to like components, a vehicle seat stabilization system is shown generally at 10 in FIG. 1. The vehicle seat stabilization system 10 of the present invention is typically useful for automotive applications, such as a passenger car or pick-up truck. However, it is to be appreciated that the vehicle seat stabilization system 10 of the present invention may also be useful for non-automotive applications, such as, but not limited to, aviation, rail, and marine applications.

Referring to FIG. 1, the vehicle seat stabilization system 10 is configured for minimizing downward displacement of a seat cushion 12 of a vehicle seat 14 upon vehicle impact. The vehicle seat stabilization system 10 includes the vehicle seat 14 and a stabilization device 16, as set forth in more detail below. The vehicle seat 14 is configured for supporting an occupant 18 of a vehicle 20. The occupant 18 is typically a driver or a front passenger of the vehicle 20, but it is to be appreciated that the occupant 18 may be any passenger of the vehicle 20. As is known in the art, the vehicle seat 14 generally supports a head, a torso, and legs of the occupant 18 during vehicle operation.

Figure 2:
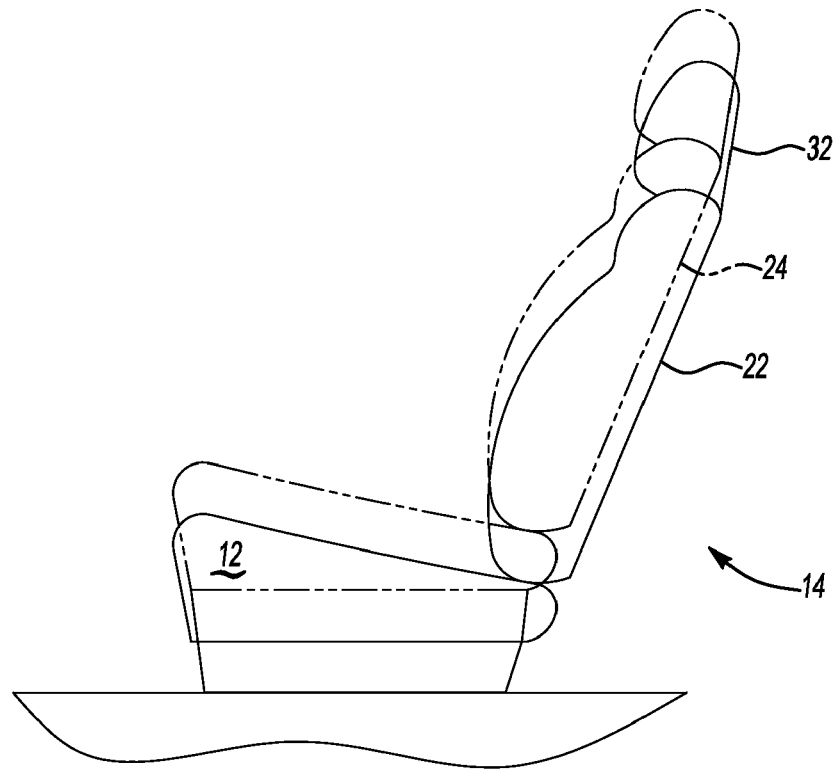
FIG. 2 is a schematic side view of the vehicle seat of FIG. 1 disposed in a first vertical position and a second vertical position in the vehicle.

Referring to FIG. 2, the vehicle seat 14 has a first vertical position 22 and a second vertical position 24. That is, the vehicle seat 14 is preferably a height-adjustable vehicle seat, also referred to as a lift-capable vehicle seat, i.e., a vertical position of the vehicle seat 14 may be adjusted according to occupant height. Preferably, the first vertical position 22 is lower than the second vertical position 24, i.e., the first vertical position 22 is closer to a floor of the vehicle 20 than the second vertical position 24. Stated differently, the first vertical position 22 preferably disposes the vehicle seat 14 relatively lower as compared to the second vertical position 24. Therefore, the first vertical position 22 is preferably useful for occupants 18 having relatively longer torso length or shorter leg length, e.g., shorter occupants 18, as compared to occupants who adjust the vehicle seat 14 to the second vertical position 24, e.g., occupants 18 having relatively shorter torso length or longer leg length. It is to be appreciated that the vehicle seat 14 may have a plurality of vertical positions in addition to the first vertical position 22 and the second vertical position 24. For example, the vehicle seat 14 may be adjusted to a low vertical position, corresponding to the first vertical position 22, one or more medium vertical positions, and a high vertical position, corresponding to the second vertical position 24 of the vehicle seat 14.

Figure 3:
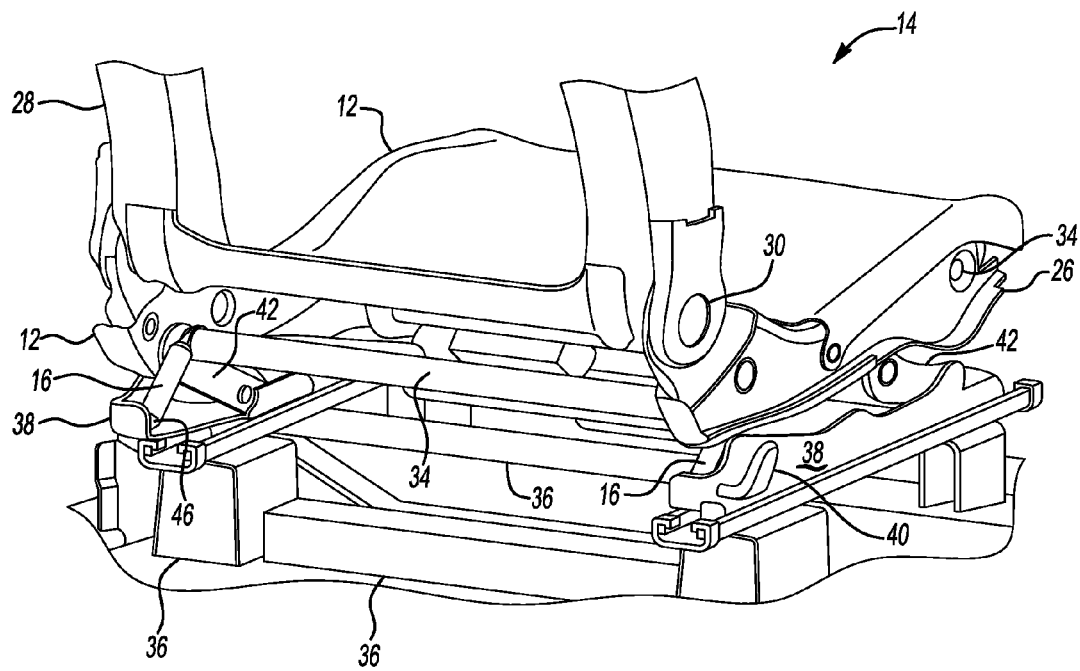
FIG. 3 is a partial perspective view of the vehicle seat stabilization system of FIG. 1 including the vehicle seat of FIGS. 1 and 2 and a stabilization device.

Referring to FIGS. 2 and 3, the vehicle seat 14 includes the seat cushion 12. The seat cushion 12 has a frame 26 and is configured for supporting the occupant 18 seated thereon. The frame 26 may be, for example, unitary, that is, integrally-formed, or may include a plurality of coupled beams. The seat cushion 12 may be covered and/or encased with a material such as, but not limited to, foam, e.g., polyurethane foam, fabric, and combinations thereof to enhance occupant comfort.

In one embodiment, the vehicle seat 14 further includes a seat back 28 configured for supporting the torso of the occupant 18 seated on the seat cushion 12. The seat back 28 may also be covered and/or encased with a material such as, but not limited to, foam, e.g., polyurethane foam, fabric, and combinations thereof to enhance occupant comfort. Referring to FIG. 3, the seat cushion 12 and seat back 28 are preferably arranged and pivotably coupled in an L-shape to support the occupant 18 during vehicle operation. That is, the seat cushion 12 and seat back 28 are preferably coupled at a pivot point 30 to allow the occupant 18 to adjust the vehicle seat 14 according to individual occupant comfort preferences.

Referring to FIG. 2, the seat back 28 may include a head restraint, shown generally at 32, configured for supporting a head of the occupant 18. The head restraint 32 may be any head restraint known in the art. For example, the head restraint 32 may be selected from the group of adjustable head restraints, non-adjustable head restraints, head restraints integrated into the seat back 28, head restraints distinct from the seat back 28, and combinations thereof.

Figure 7:
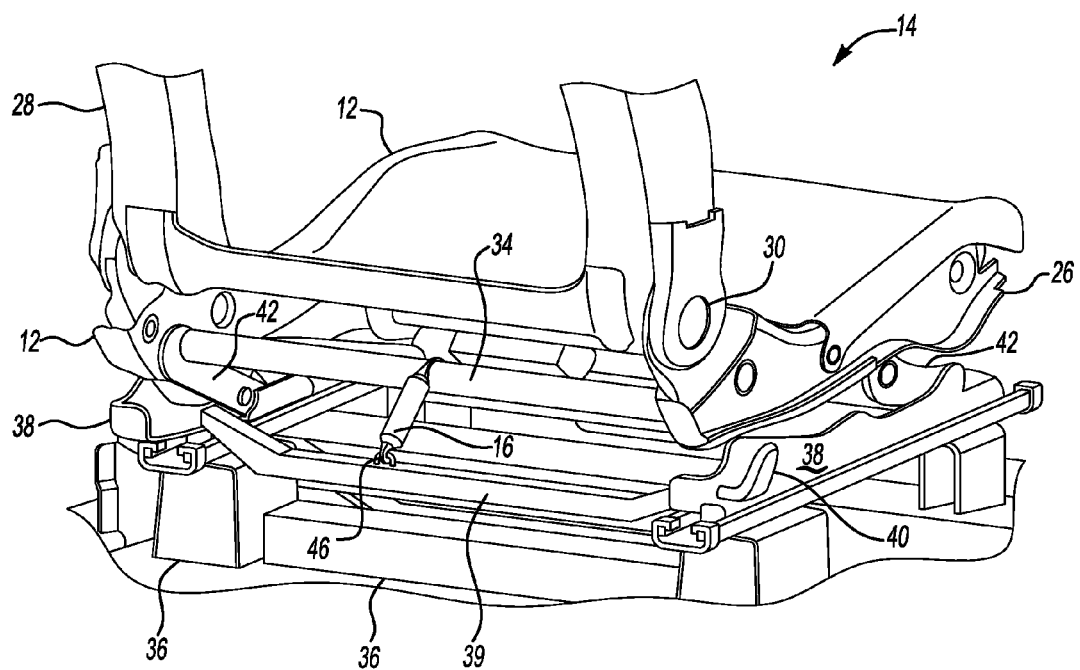
FIG. 7 is a partial perspective view of another embodiment of the vehicle seat stabilization system of FIG. 1 including the vehicle seat and the stabilization device of FIGS. 3, 4A, 4B, 5A, 5B, and 6.

Referring to FIGS. 3 and 7, the vehicle seat 14 also includes a torque tube 34 configured for minimizing torsion of the seat cushion 12. That is, the torque tube 34 may minimize twisting and/or bending of the frame 26 of the vehicle seat 14. Stated differently, the torque tube 34 preferably provides support for the frame 26 to ensure that vertical displacement of each side of the frame 26 is synchronized during adjustment of the vehicle seat 14 from the first vertical position 22 to the second vertical position 24, or from the second vertical position 24 to the first vertical position 22 by the occupant 18. The torque tube 34 is disposed between and attached to the frame 26 of the seat cushion 12. Preferably, the torque tube 34 is disposed parallel to two of the four sides of the frame 26 and perpendicular to another two sides of the frame 26 of the seat cushion 12. The torque tube 34 may be attached to the frame 26 of the seat cushion 12 via any suitable attachment device, such as, but not limited to, welds, bolts, and screws. The torque tube 34 may also be unitarily formed, i.e., integral, with the frame 26.

Referring to FIG. 3, the vehicle seat 14 includes a mounting arrangement, shown generally at 36, configured for attaching the vehicle seat 14 to the vehicle 20. The mounting arrangement 36 preferably attaches the vehicle seat 14 to the floor of the vehicle 20. The mounting arrangement 36 may include any mounting arrangement known in the art that is suitable for securely attaching the vehicle seat 14 to the vehicle 20. For example, the mounting arrangement 36 may include one or more bolts, screws, fasteners, tethers, pulleys, anchors, rails, bolsters, frames, and combinations thereof.

The vehicle seat 14 also includes a slide assembly, shown generally at 38, configured for translating the vehicle seat 14 fore and aft. That is, the vehicle seat 14 is preferably both vertically adjustable via the first vertical position 22 and the second vertical position 24 as set forth above, and longitudinally adjustable along a path of vehicle travel via the slide assembly 38. In one embodiment, the slide assembly 38 is configured for mechanically translating the vehicle seat 14 fore and aft. As used herein, the terminology mechanically refers to purely physical, as opposed to chemical or other movements and forces effected by components of the present invention. Therefore, notably, the slide assembly 38 preferably does not include a hydraulic fluid. Similarly, the slide assembly 38 preferably does not include a pneumatic fluid. Rather, the slide assembly 38 is preferably configured for mechanically translating the vehicle seat 14 fore and aft according to a preference and action of the occupant 18. Therefore, in operation, the vehicle seat 14 may be mechanically adjusted by the occupant 18 to suit the comfort of the occupant 18. For example, if an occupant 18 desires to be disposed closer to a dashboard (not shown) of the vehicle 20, the occupant 18 may translate the vehicle seat 14 fore via the slide assembly 38 by depressing a lever 40 and pulling the vehicle seat 14 toward the dashboard. The slide assembly 38 may be any known slide assembly known in the art, but preferably includes a pair of carriages configured for translating along a pair of rails, and a locking mechanism. Referring to FIG. 7, in another embodiment, the slide assembly 38 may also include a support 39 that is disposed between and attached to the pair of carriages. In this embodiment, the support 39 is configured for providing the vehicle seat 14 with additional lateral reinforcement between the pair of carriages.

The vehicle seat 14 also includes a lift linkage 42 configured for mechanically moving the vehicle seat 14 from the first vertical position 22 to the second vertical position 24. That is, the lift linkage 42 is configured for raising or lowering the vehicle seat 14 and provides adjustability of the vehicle seat 14 according to occupant height and/or comfort preferences. Referring to FIG. 3, the lift linkage 42 is pivotably attached to the seat cushion 12 and the slide assembly 38. In operation, the lift linkage 42 preferably pivots at the frame 26 of the seat cushion 12 and the slide assembly 38 to raise or lower the vehicle seat 14. It is to be appreciated that the lift linkage 42 mechanically moves the vehicle seat 14. Therefore, notably, the lift linkage 42 preferably does not include a hydraulic fluid. Similarly, the lift linkage 42 preferably does not include a pneumatic fluid. Rather, the lift linkage 42 is configured for mechanically moving the vehicle seat 14 according to the preference and action of the occupant 18. As such, the lift linkage 42 is preferably a bar or lever, but may be any suitable lift linkage known in the art.

In one embodiment, the vehicle seat 14 includes a plurality of lift linkages 42. For example, the vehicle seat 14 may include two lift linkages 42. In this embodiment, each of the two lift linkages 42 is preferably disposed at a rear of the seat cushion 12. Alternatively, the vehicle seat 14 may include four lift linkages 42. In this embodiment, two of the four lift linkages 42 are preferably disposed at the rear of the seat cushion 12, and two of the four lift linkages 42 are preferably disposed at the front of the seat cushion 12.

Referring to FIGS. 4A and 4B, the stabilization device 16 of the vehicle seat stabilization system 10 is configured for minimizing downward displacement of the seat cushion 12 upon vehicle impact, as set forth in more detail below. The stabilization device 16 has a proximal end 44 and a distal end 46, wherein the distal end 46 is attached to the vehicle seat 14.

Referring to FIG. 3, in one embodiment, the distal end 46 of the stabilization device 16 is attached to the slide assembly 38. The distal end 46 is preferably removably attached to the slide assembly 38. The distal end 46 may include any suitable apparatus and/or configuration known in the art for removable attachment of components. For example, in one embodiment, the distal end 46 of the stabilization device 16 is formed in an eyelet that preferably surrounds a head of a bolt of the slide assembly 38. In another embodiment, the distal end 46 of the stabilization device 16 is formed in a hook that may be coupled to a bolt, notch, or loop of the slide assembly 38.

Referring to FIG. 7, in another embodiment, the distal end 46 of the stabilization device 16 is attached to the support 39 of the slide assembly 38. The distal end 46 is preferably removably attached to the support 39. The distal end 46 may include any suitable apparatus and/or configuration known in the art for removable attachment of components. For example, in one embodiment, the distal end 46 of the stabilization device 16 is formed in an eyelet that preferably surrounds a head of a bolt of the support 39 of the slide assembly 38. In another embodiment, the distal end 46 of the stabiliza-tion device 16 is formed in a hook that may be coupled to a bolt, notch, or loop of the support 39 of the slide assembly 38.

Referring to FIGS. 4A and 4B, the distal end 46 of the stabilization device 16 is also preferably substantially hermetically sealed. As used herein, the terminology substantially hermetically sealed refers to being tightly sealed so that fluid cannot escape or enter. The distal end 46 of the stabilization device 16 is also preferably closed. That is, the distal end 46 is preferably sealed so that a fluid 48, set forth in more detail below, preferably does not escape via the distal end 46. Further, either or both of the distal end 46 and the proximal end 44 may be tapered inwardly.

Referring to FIGS. 4A and 4B, the stabilization device 16 includes a first cylinder 50. The first cylinder 50 is preferably configured for containing the fluid 48. The first cylinder 50 is preferably sealed, for example, by a gasket (not shown), to contain the fluid 48 within the first cylinder 50. Further, the first cylinder 50 also preferably forms an exterior of the stabilization device 16. The first cylinder 50 may be formed from any material suitable for automotive applications, but is preferably formed from a polymer or metal, such as, but not limited to, steel or aluminum. Further, the first cylinder 50 is preferably generally cylindrically-shaped, but may alternatively be, for example, box-shaped or hexagonally-shaped.

The stabilization device 16 also includes a second cylinder 52 disposed entirely within the first cylinder 50. The second cylinder 52 cooperates with the first cylinder 50 to define a conduit 54 between the first cylinder 50 and the second cylinder 52. That is, the first cylinder 50 preferably contains the second cylinder 52. The second cylinder 52 preferably defines a proximal opening 56 and a distal opening 58 and thereby cooperates with the first cylinder 50 to define the conduit 54 between the first cylinder 50 and the second cylinder 52. Further, a length of the second cylinder 52 is preferably greater than or equal to one half of a length of the first cylinder 50. The second cylinder 52 may be formed from any material suitable for automotive applications, but is preferably formed from a polymer or metal, such as, but not limited to, steel or aluminum. The second cylinder 52 is preferably generally cylindrically-shaped, but may alternatively be, for example, box-shaped or hexagonally-shaped. The second cylinder 52 preferably tapers inwardly at the distal opening 58. However, it is to be appreciated that the second cylinder 52 may also or alternatively taper inwardly at any other location, such as, but not limited to, the proximal opening 56. In another embodiment, the first cylinder 50 and the second cylinder 52 may be stamped from a cylindrically-shaped, box-shaped, or hexagonally-shaped dual-sided symmetrical stamping to form the resulting first cylinder 50 and second cylinder 52.

The stabilization device 16 also includes a piston 60 having a proximal side 62 and a distal side 64. The piston 60 is configured for sealingly sliding in the second cylinder 52 so as to divide the second cylinder 52 and define a first chamber 66 adjacent the proximal side 62 of the piston 60 and a second chamber 68 adjacent the distal side 64 of the piston. That is, the piston 60 preferably forms a fluid-tight seal with the second cylinder 52 and slides along a central axis A of the second cylinder 52. To form the fluid-tight seal, the piston 60 is generally shaped according to a shape of the second cylinder 52. For example, in an embodiment where the second cylinder 52 is generally cylindrically-shaped, the piston 60 is also generally cylindrically-shaped.

The first chamber 66 and the second chamber 68 of the second cylinder 52 are in fluid communication via the conduit 54. That is, the fluid 48 may travel from the second chamber 68, through the distal opening 58 of the second cylinder 52, through the conduit 54, to the proximal opening 56 and the first chamber 66 of the second cylinder 52. Alternatively, the fluid 48 may travel from the first chamber 66, through the proximal opening 56 of the second cylinder 52, through the conduit 54, to the distal opening 58 and the second chamber 68 of the second cylinder 52.

The stabilization device 16 also includes a rod 70 coupled to the piston 60 and the torque tube 34 of the vehicle seat 14 and extending through the proximal end 44 of the stabilization device 16. The rod 70 is preferably coupled to the piston 60 by any suitable coupler known in the art. For example, the rod 70 may be welded to the piston 60. Preferably, the rod 70 is not removable from the piston 60.

Referring to FIGS. 3 and 7, the rod 70 is preferably removably coupled to the torque tube 34 via any suitable apparatus and/or configuration known in the art for removable coupling of components. For example, in one embodiment, an end 72 of the rod 70 is formed in an eyelet that preferably surrounds a head of a bolt of the torque tube 34. In operation, the rod 70 extends through the proximal end 44 of the stabilization device 16, couples to the torque tube 34, and slides the piston 60 along central axis A as the vehicle seat 14 is moved from the first vertical position 22 to the second vertical position 24, or from the second vertical position 24 to the first vertical position 22, via the lift linkage 42. That is, since the distal end 46 of the stabilization device 16 is attached to the slide assembly 38 of the vehicle seat 14, as the height of the vehicle seat 14 is adjusted by the occupant 18, the rod 70 translates the piston 60 along central axis A. Additionally, since the distal end 46 of the stabilization device 16 is attached to the slide assembly 38 of the vehicle seat 14, the height of the vehicle seat 14 may be adjusted without hindering fore and aft translation of the vehicle seat 14. Stated differently, the stabilization device 16 preferably translates fore and aft with the vehicle seat 14 during fore or aft adjustment of the vehicle seat 14 by the occupant 18. The rod 70 preferably does not extend through the distal end 46 of the stabilization device 16.

Referring to FIGS. 4A and 4B, the stabilization device 16 includes the fluid 48 contained within the first cylinder 50 for fluid communication between the first chamber 66 and the second chamber 68 via the conduit 54. That is, as set forth above, in operation, the fluid 48 may travel from the second chamber 68, through the distal opening 58 of the second cylinder 52, through the conduit 54, to the proximal opening 56 and the first chamber 66 of the second cylinder 52. Alternatively, the fluid 48 may travel from the first chamber 66, through the proximal opening 56 of the second cylinder 52, through the conduit 54, to the distal opening 58 and the second chamber 68 of the second cylinder 52.

In one embodiment, the fluid 48 is a hydraulic fluid. For example, the fluid 48 may be hydraulic oil. The hydraulic fluid 48 preferably has a kinematic viscosity of from 100 to 130, more preferably 110 to 120, cSt at 40° C., and a specific gravity of from 0.8 to 1.2, more preferably 0.9 to 1.1, at 25° C. In another embodiment, the fluid 48 is a pneumatic fluid. A suitable pneumatic fluid for purposes of the present invention is air.

The stabilization device 16 also includes a member 74 disposed within the second cylinder 52. The member 74 is moveable upon vehicle impact to seal off fluid communication between the conduit 54 and the second chamber 68 so as to minimize downward displacement of the seat cushion 12 upon vehicle impact when the vehicle seat 14 is disposed in the second vertical position 24. The member 74 is preferably a ball, but may be any suitable member moveable to seal off fluid communication. In one embodiment, the stabilization device 16 also includes a biasing support, shown generally at 76 in FIGS. 5A and 5B. The biasing support 76 is generally configured for both supporting the member 74 within the second cylinder 52 and compressing upon vehicle impact. The biasing support 76 preferably allows fluid communication between the second chamber 68 and the conduit 54 under non-vehicle impact conditions, i.e., under standard vehicle operation where the vehicle 20 is not subject to vehicle impact. For example, the biasing support 76 may be a spring coupled to opposing sides of the second cylinder 52. In another embodiment, the biasing support 76 may be a compressible sieve.

Referring to FIGS. 5A and 5B, in operation under non-vehicle impact conditions, the member 74 freely moves within the second chamber 68 of the second cylinder 52 in response to a change in a volume of fluid 48 disposed within the second chamber 68. Stated differently, when the occupant 18 raises the vehicle seat 14 to the second vertical position 24, the rod 70 pulls the piston 60 in the direction of arrow B as the seat cushion 12 is raised via the lift linkage 42. As the piston 60 sealingly slides in the direction of arrow B, the fluid 48 moves freely, i.e., moves with minimal resistance, between the first cylinder 50 and the second cylinder 52 via the conduit 54. Since the member 74 also moves freely within the second chamber 68 of the second cylinder 52, suction created by the piston 60 sealingly sliding in the direction of arrow B draws fluid 48 into the second chamber 68 from the conduit 54 through the distal opening 58 of the second cylinder 52.

Similarly, referring to FIG. 5B, in operation under non-vehicle impact conditions, i.e., under standard vehicle operation where the vehicle 20 is not subject to vehicle impact, when the occupant 18 lowers the vehicle seat 14 to the first vertical position 22, the rod 70 pushes the piston 60 in the direction of arrow C as the seat cushion 12 is lowered via the lift linkage 42. As the piston 60 sealingly slides in the direction of arrow C, the fluid 48 moves freely, i.e., moves with minimal resistance, between the first cylinder 50 and the second cylinder 52 via the conduit 54. Since the member 74 also moves freely within the second chamber 68 of the second cylinder 52, pressure created by the piston 60 sealingly sliding in the direction of arrow C pushes fluid 48 out of the second chamber 68 and into the conduit 54 through the distal opening 58 of the second cylinder 52. In use under non-vehicle impact conditions, the member 74 does not seal off fluid communication between the conduit 54 and the second chamber 68. Rather, the member 74 preferably rests upon the biasing support 76 so as to allow fluid communication between the conduit 54 and the second chamber 68.

Upon vehicle impact where the vehicle seat 14 is disposed in the second vertical position 24, i.e., where the vehicle seat 14 is adjusted for the height of the occupant 18, the vehicle impact may impart substantial forces to the vehicle seat 14. For example, a rear impact, i.e., an impact to a rear portion of the vehicle 20, may impart downward forces which may downwardly displace the seat cushion 12 of the vehicle seat 14. In particular, the downward displacement of the seat cushion 12 may cause a rearward angle displacement of the vehicle seat 14, more specifically, the seat back 28.

Figure 6:
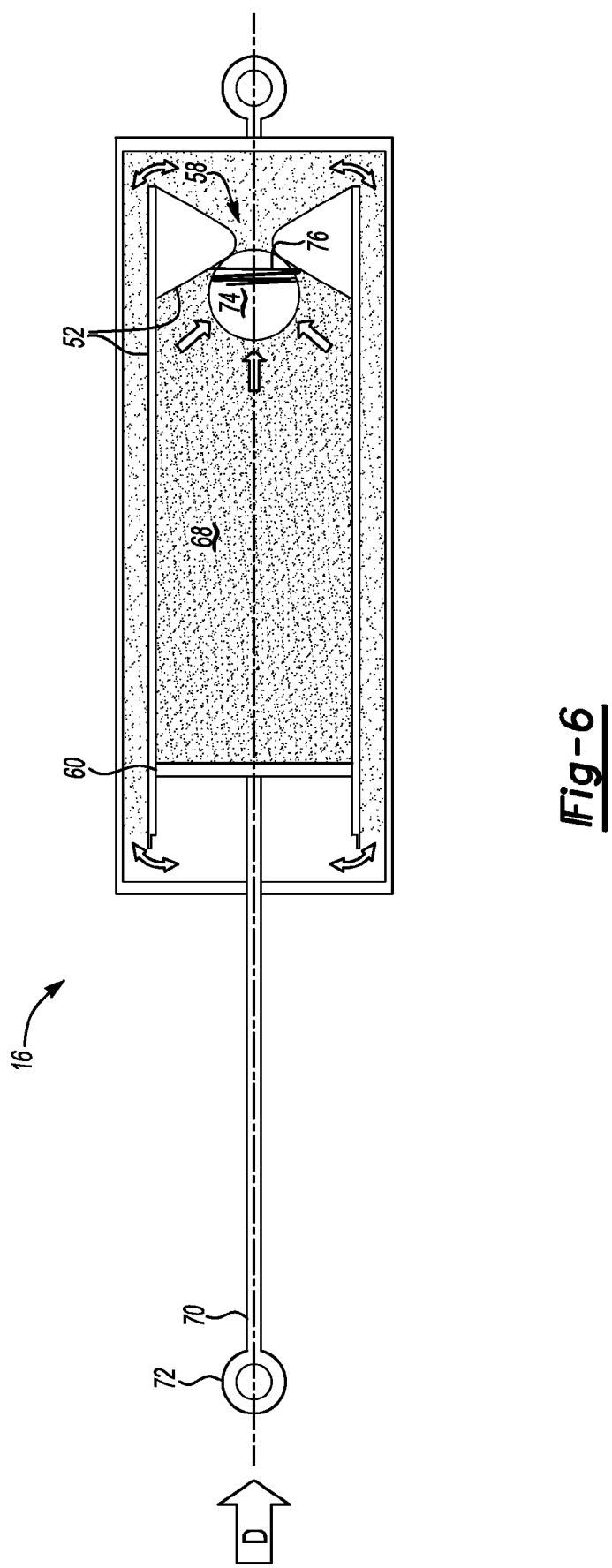
FIG. 6 is a schematic side view of the stabilization device of FIGS. 3, 4A, and 4B depicting operation in a vehicle upon vehicle impact wherein a member seals off fluid communication between a conduit and a second chamber of the stabilization device.

Referring to FIG. 6, upon vehicle impact, the stabilization device 16 is configured to minimize downward displacement of the seat cushion 12 upon vehicle impact. That is, upon vehicle impact, if the seat cushion 12 attempts to displace downwardly, e.g. from the second vertical position 24 to the first vertical position 22, the fluid 48 resists sudden movement of the piston 60 in the direction of arrow D. Additionally, the member 74 preferably compresses the biasing support 76 and seats adjacent the second cylinder 52 to seal off fluid communication between the second chamber 68 and the conduit 54 in response to the vehicle impact. Thus, the stabilization device 16 minimizes downward displacement of the seat cushion 12 upon vehicle impact. That is, the vehicle seat stabilization system 10 including the stabilization device 16 compensates for forces imparted to the seat cushion 12 upon vehicle impact. Additionally, since the vehicle seat stabilization system 10 allows fluid communication between the second chamber 68 and the conduit 54 during non-vehicle impact conditions, the occupant 18 is able to adjust the vehicle seat 14 from the first vertical position 22 to the second vertical position 24 and vice versa with ease. Therefore, the vehicle seat stabilization system 10 is not perceived by the occupant 18. Further, since the stabilization device 16 is self-contained and easily installed in the vehicle 20, the vehicle seat stabilization system 10 is cost-effective.

It is to be appreciated that the vehicle seat stabilization system 10 may include a plurality of torque tubes 34. For example, in one embodiment, the vehicle seat stabilization system 10 includes at least two torque tubes 34, wherein the torque tubes 34 are preferably disposed parallel to each other and attached to the frame 26 of the vehicle seat 14. In this embodiment, the vehicle seat stabilization system 10 may also include a plurality of stabilization devices 16. For example, the vehicle seat stabilization system 10 may include two stabilization devices 16. In this embodiment, each of the two stabilization devices 16 is preferably disposed at a rear of the seat cushion 12. Alternatively, the vehicle seat stabilization system 10 may include four stabilization devices 16. In this embodiment, two of the four stabilization devices 16 are preferably disposed at the rear of the seat cushion 12, and two of the four stabilization devices 16 are preferably disposed at the front of the seat cushion 12.

While the best modes for carrying out the invention have been described in detail, those familiar with the art to which this invention relates will recognize various alternative designs and embodiments for practicing the invention within the scope of the appended claims.

The invention claimed is:

1. A stabilization device configured for minimizing downward displacement of a seat cushion of a vehicle seat upon vehicle impact, said stabilization device having a proximal end and a distal end and comprising:
    a first cylinder;
    a second cylinder disposed entirely within said first cylinder and cooperating with said first cylinder to define a conduit between said first cylinder and said second cylinder;
    a piston having a proximal side and a distal side and configured for sealingly sliding in said second cylinder so as to divide said second cylinder and define a first chamber adjacent said proximal side of said piston and a second chamber adjacent said distal side of said piston, wherein said first chamber and said second chamber are in fluid communication via said conduit;
    a rod coupled to said piston and extending through said proximal end of said stabilization device;
    a fluid contained within said first cylinder for fluid communication between said first chamber and said second chamber via said conduit; and
    a member disposed within said second cylinder and moveable upon vehicle impact to seal off fluid communication between said conduit and said second chamber so as to minimize downward displacement of the seat cushion upon vehicle impact.

2. The stabilization device of claim 1, wherein said stabilization device is substantially hermetically sealed.

3. The stabilization device of claim 2, wherein said rod does not extend through said distal end of said stabilization device.

4. The stabilization device of claim 1, wherein said fluid is a hydraulic fluid.

5. A vehicle seat stabilization system configured for minimizing downward displacement of a seat cushion of a vehicle seat upon vehicle impact, said vehicle seat stabilization system comprising:
    said vehicle seat configured for supporting an occupant of a vehicle and having a first vertical position and a second vertical position, said vehicle seat including;
    said seat cushion having a frame and configured for supporting the occupant seated thereon;
    a torque tube configured for minimizing torsion of said seat cushion and disposed between and attached to said frame of said seat cushion;
    a mounting arrangement configured for attaching said vehicle seat to said vehicle;
    a slide assembly configured for translating said vehicle seat fore and aft; and
    a lift linkage configured for mechanically moving said vehicle seat from said first vertical position to said second vertical position, wherein said lift linkage is pivotably attached to said seat cushion and said slide assembly; and
    a stabilization device configured for minimizing downward displacement of said seat cushion upon vehicle impact, said stabilization device having a proximal end and a distal end, wherein said distal end is attached to said vehicle seat, said stabilization device including:
    a first cylinder;
    a second cylinder disposed entirely within said first cylinder and cooperating with said first cylinder to define a conduit between said first cylinder and said second cylinder;
    a piston having a proximal side and a distal side and configured for sealingly sliding in said second cylinder so as to divide said second cylinder and define a first chamber adjacent said proximal side of said piston and a second chamber adjacent said distal side of said piston, wherein said first chamber and said second chamber are in fluid communication via said conduit;
    a rod coupled to said piston and said torque tube and extending through said proximal end of said stabilization device;
    a fluid contained within said first cylinder for fluid communication between said first chamber and said second chamber via said conduit; and
    a member disposed within said second cylinder and moveable upon vehicle impact to seal off fluid communication between said conduit and said second chamber so as to minimize downward displacement of said seat cushion upon vehicle impact when said vehicle seat is disposed in said second vertical position.

6. The vehicle seat stabilization system of claim 5, wherein said lift linkage does not include a hydraulic fluid.

7. The vehicle seat stabilization system of claim 5, wherein said lift linkage does not include a pneumatic fluid.

8. The vehicle seat stabilization system of claim 5, wherein said slide assembly is configured for mechanically translating said vehicle seat fore and aft.

9. The vehicle seat stabilization system of claim 5, wherein said distal end of said stabilization device is attached to said slide assembly.

10. The vehicle seat stabilization system of claim 5, wherein said stabilization device is substantially hermetically sealed.

11. The vehicle seat stabilization system of claim 10, wherein said distal end of said stabilization device is closed.

12. The vehicle seat stabilization system of claim 11, wherein said rod does not extend through said distal end of said stabilization device.

13. The vehicle seat stabilization system of claim 5, wherein a length of said second cylinder is greater than or equal to one half of a length of said first cylinder.

14. The vehicle seat stabilization system of claim 5, wherein said vehicle seat includes a seat back configured for supporting the occupant seated on said seat cushion.

15. The vehicle seat stabilization system of claim 5, wherein said fluid is a hydraulic fluid.

16. The vehicle seat stabilization system of claim 5, wherein said fluid is a pneumatic fluid.

17. The vehicle seat stabilization system of claim 5 including a plurality of torque tubes.

18. The vehicle seat stabilization system of claim 17 including a plurality of stabilization devices.

* * * * *